United States Patent [19]

Deslandes

[11] Patent Number: 5,022,283

[45] Date of Patent: Jun. 11, 1991

[54] TURN SIGNAL AUXILIARY LEVER APPARATUS

[76] Inventor: Mark R. Deslandes, R.F.D. #2 Box 119, North Troy, Vt. 05859

[21] Appl. No.: 500,532

[22] Filed: Mar. 26, 1990

[51] Int. Cl.⁵ .............................................. G05G 1/04
[52] U.S. Cl. ........................................ 74/523; 74/524; 74/543
[58] Field of Search ................... 74/524, 544, 543, 523

[56] References Cited

U.S. PATENT DOCUMENTS

| | | | |
|---|---|---|---|
| 752,738 | 2/1904 | Wheeler | 74/524 |
| 1,103,686 | 7/1914 | Pue | 74/536 |
| 1,301,475 | 4/1919 | Mellin | 74/524 |
| 1,538,572 | 5/1925 | Miller | 74/523 X |
| 2,185,024 | 12/1939 | Eddy | 74/543 |
| 2,523,491 | 9/1950 | Auten | 74/524 X |
| 3,373,628 | 3/1968 | Lake et al. | 74/544 X |
| 4,677,932 | 7/1987 | Ewing | 74/523 X |
| 4,811,921 | 3/1989 | Whitaker et al. | 74/523 X |

FOREIGN PATENT DOCUMENTS 781082  8/1957  United Kingdom .................. 74/543

Primary Examiner—Rodney M. Lindsey
Attorney, Agent, or Firm—Leon Gilden

[57] ABSTRACT

An apparatus including a split housing securable together mounted in surrounding relationship relative to a steering column housing. A multi-angulated actuation lever is mounted overlying the split housing and terminates in a forward first leg pivotally mounted to a collar that in turn is surroundingly secured in a sliding relationship relative to a turn signal lever. The actuation lever is pivotally mounted to the split housing and extends laterally therebeyond in a right-hand orientation. The actuation lever may further include a telescoping section to accommodate variations in physical capabilities and characteristics of a user, and wherein the lever may further include a rotatable coupling to permit angular orientation of the actuation lever relative to the split housing for enhanced positioning of the actuation lever relative to the split housing.

2 Claims, 4 Drawing Sheets

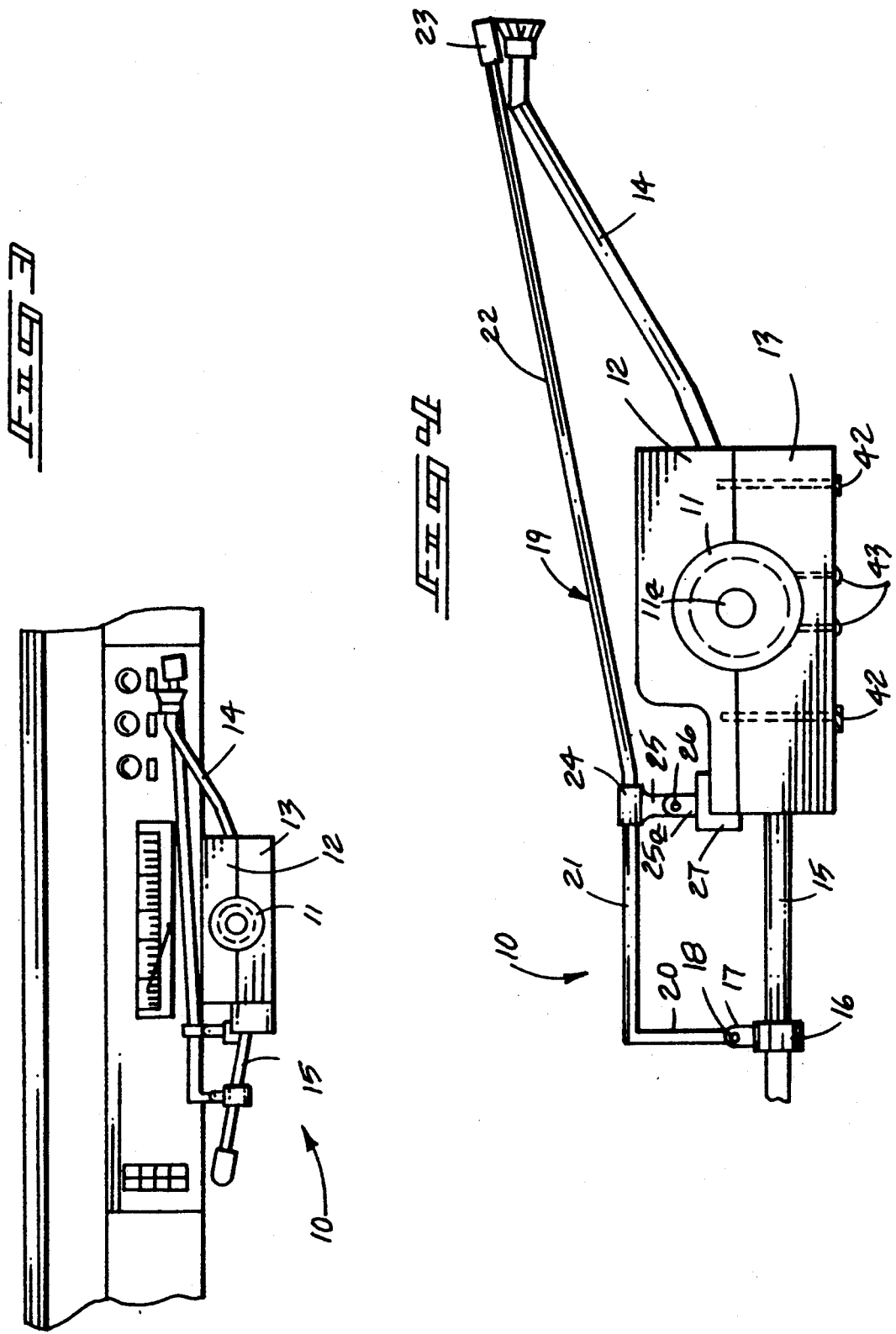

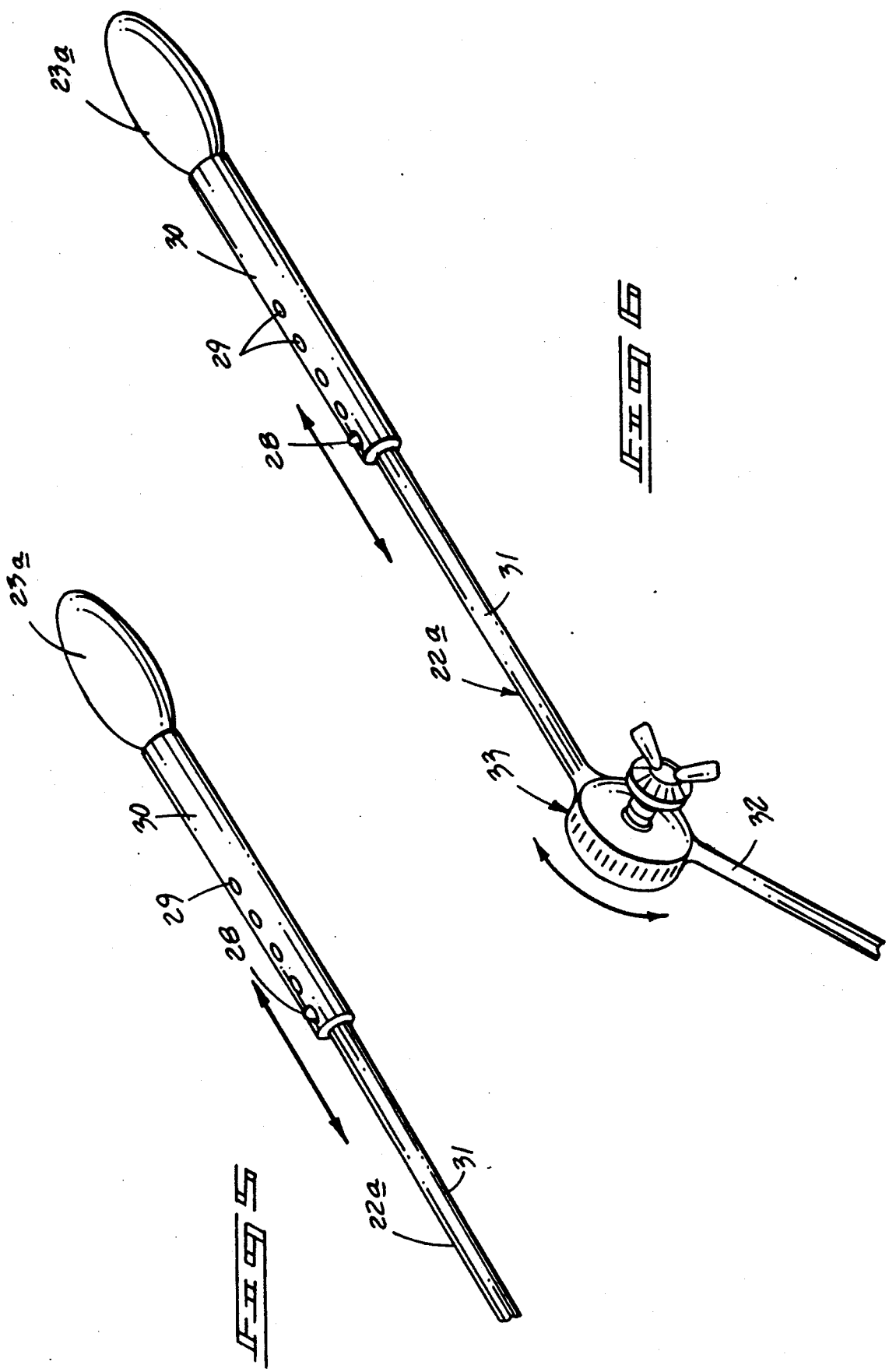

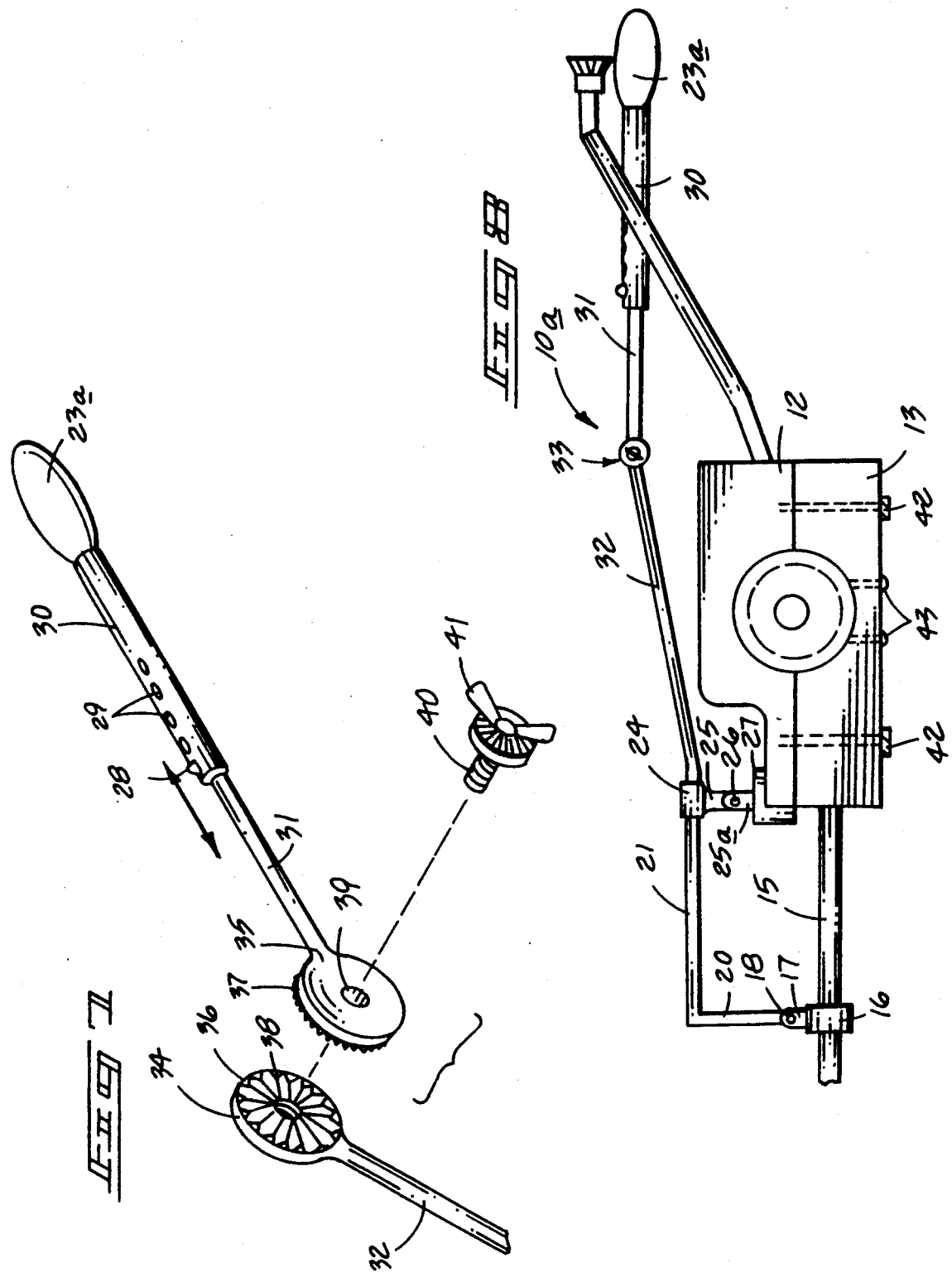

5,022,283

TURN SIGNAL AUXILIARY LEVER APPARATUS

BACKGROUND OF THE INVENTION

1. Field of the Invention

The field of invention relates to hand control apparatus utilized in automotive environments, and more particularly pertains to a new and improved turn signal auxiliary lever apparatus wherein the same is operative to assist individuals of impaired physical characteristics in right-hand control organizations permitting right-hand control of a turn signal lever in an automotive environment.

2. Description of the Prior Art

Auxiliary manual controls exist in an automotive environment to assist individual's of impaired physical capabilities in the effective utilization of various controls utilized in automotive operation. While various control organizations have been utilized to assist right-hand manual control of various automotive equipment, the prior art has heretofore failed to provide an apparatus to easily and readily assist individuals of impaired physical capabilities in right-hand manual control of an associated turn signal lever typically directed in a leftward direction relative to an associated steering column. Examples of the prior art include U.S. Pat. No. 3,358,527 to Lake, et al., illustrating the use of a control lever rotatably mounted to a steering column, wherein through a pivot connection, permits alternative actuation of a brake and accelerator pedal utilized in an automotive vehicle.

U.S. Pat. No. 2,641,939 to McKee illustrates the use of a pivotally mounted lever relative to an air brake actuation lever to permit ease of access relative to the air brake lever.

U.S. Pat. No. 2,112,804 to Bahr sets forth the use of a brake lever extension, wherein the lever extension is mounted generally orthogonally relative to a brake lever to assist in mechanical manipulation of the brake lever.

U.S. Pat. No. 2,915,915 to McKay sets forth the use of an auxiliary gear shift for particular use with outboard motors, wherein the gear shift lever utilizes an adjustable extension mounted relative to the outboard gear shift lever to provide ease of access and manipulation relative to the outboard gear shift lever.

As such, it may be appreciated that there continues to be a need for a new and improved turn signal auxiliary lever apparatus as set forth by the instant invention which addresses both the problems of ease of use, as well as effectiveness in construction and in this respect, the present invention substantially fulfills this need.

SUMMARY OF THE INVENTION

In view of the foregoing disadvantages inherent in the known types of auxiliary automotive lever control apparatus now present in the prior art, the present invention provides a turn signal auxiliary lever apparatus wherein the same permits right-hand manipulation of a leftward oriented turn signal lever in association with a vehicular steering column. As such, the general purpose of the present invention, which will be described subsequently in greater detail, is to provide a new and improved turn signal auxiliary lever apparatus which has all the advantages of the prior art auxiliary automotive lever control apparatus and none of the disadvantages.

To attain this, the present invention provides an apparatus including a split housing securable together mounted in surrounding relationship relative to a steering column housing. A multi-angulated actuation lever is mounted overlying the split housing and terminates in a forward first leg pivotally mounted to a collar that in turn is surroundingly secured in a sliding relationship relative to a turn signal lever. The actuation lever is pivotally mounted to the split housing and extends laterally therebeyond in a right-hand orientation. The actuation lever may further include a telescoping section to accommodate variations in physical capabilities and characteristics of a user, and wherein the lever may further include a rotatable coupling to permit angular orientation of the actuation lever relative to the split housing for enhanced positioning of the actuation lever relative to the split housing.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved turn signal auxiliary lever apparatus which has all the advantages of the prior art auxiliary automotive lever apparatus and none of the disadvantages.

It is another object of the present invention to provide a new and improved turn signal auxiliary lever apparatus which may be easily and efficiently manufactured and marketed.

It is a further object of the present invention to provide a new and improved turn signal auxiliary lever apparatus which is of a durable and reliable construction.

An even further object of the present invention is to provide a new and improved turn signal auxiliary lever apparatus which is susceptible of a low cost of manufacture with regard to both materials and labor, and which accordingly is then susceptible of low prices of sale to the consuming public, thereby making such turn signal auxiliary lever apparatus economically available to the buying public.

Still yet another object of the present invention is to provide a new and improved turn signal auxiliary lever apparatus which provides in the apparatuses and methods of the prior art some of the advantages thereof, while simultaneously overcoming some of the disadvantages normally associated therewith.

Still another object of the present invention is to provide a new and improved turn signal auxiliary lever apparatus wherein the same directs an actuation lever in a rightward orientation relative to a steering column to permit selective actuation of a leftward oriented turn signal lever mounted to the steering column.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic view taken in elevation of the instant invention.

FIG. 4 is an orthographic view taken in elevation of the instant invention, somewhat enlarged.

FIG. 5 is an isometric illustration of a modified extensible actuation lever utilized by the instant invention.

FIG. 6 is an isometric illustration of a modified actuation lever in association with a pivot connection.

FIG. 7 is an isometric exploded view of the actuation lever, as illustrated in FIG. 6.

FIG. 8 is an orthographic view taken in elevation of the modified actuation lever utilized in association with a typical vehicular steering column.

DESCRIPTION OF THE PREFERRED EMBODIMENT

Figure 1:
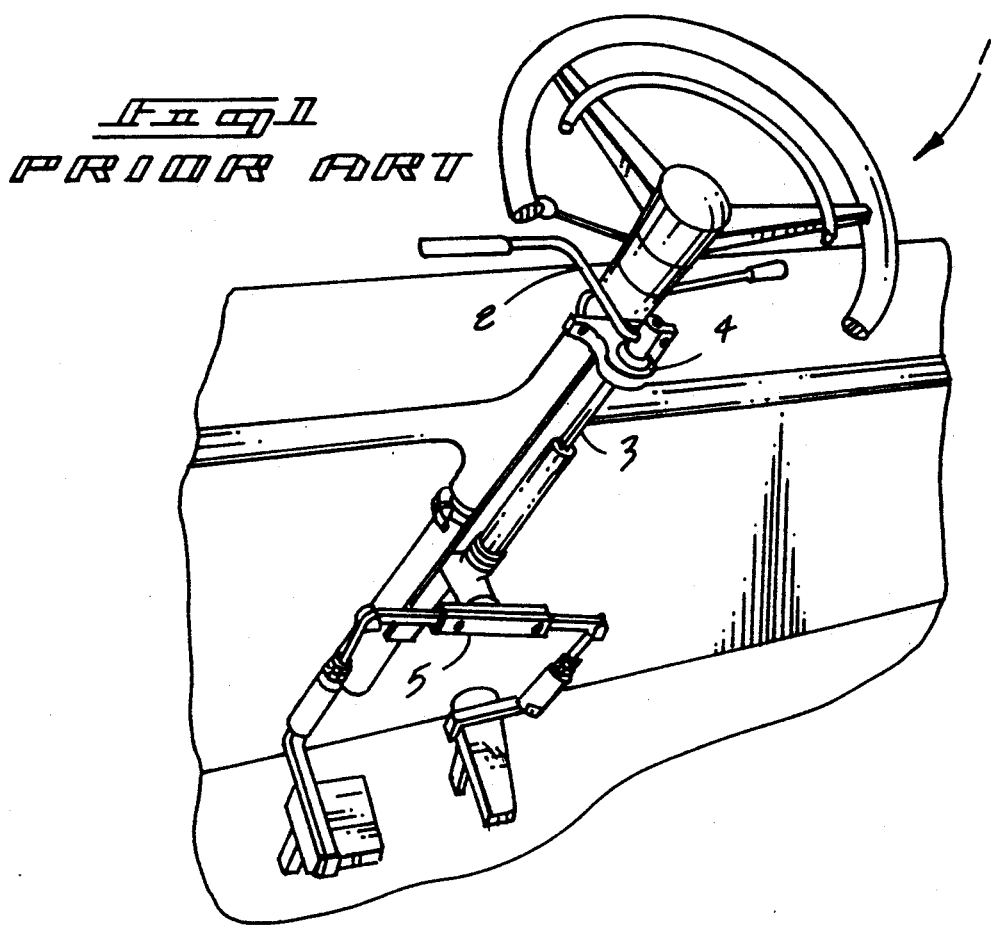
FIG. 1 is an isometric illustration of a prior art auxiliary automotive lever control apparatus.

With reference now to the drawings, and in particular to FIGS. 1 to 8 thereof, a new and improved turn signal auxiliary lever apparatus embodying the principles and concepts of the present invention and generally designated by the reference numerals 10 and 10a will be described.

Figure 2:
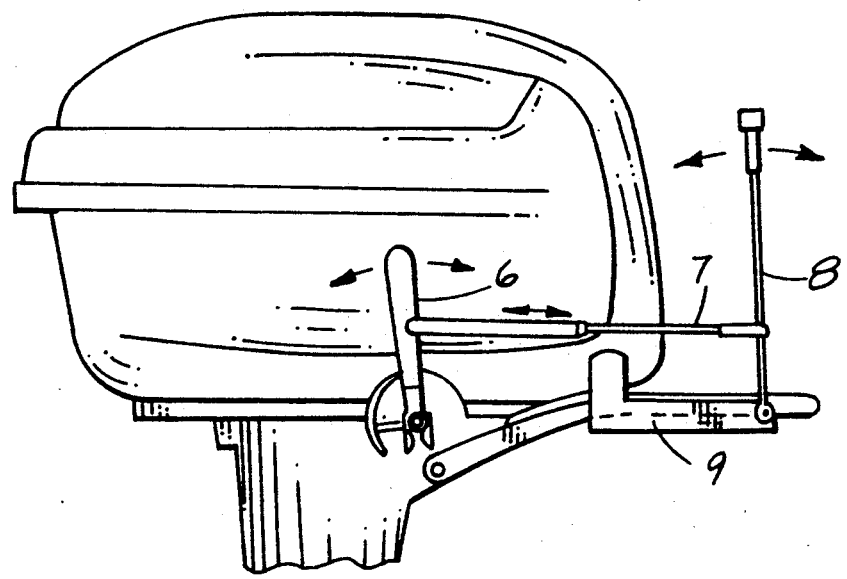
FIG. 2 is an orthographic side view taken in elevation of a prior art auxiliary lever control apparatus in cooperation with a gear shift lever of an outboard motor.

FIG. 1 illustrates a prior art auxiliary lever apparatus 1 utilized in association with a typical vehicular steering control arrangement, wherein a control lever 2 is mounted orthogonally to a shaft 3 to permit rotation of the shaft 3 and accordingly permit selective pivotment of a cross-link 5 to permit sequential actuation of an accelerator pedal and brake pedal assembly of an associated automotive vehicle. FIG. 2 illustrates a further example of an auxiliary lever apparatus in cooperation with a gear shift lever 6 of an outboard motor, wherein an adjustable link 7 associates the gear shift lever 7 and a control lever 8 mounted to a bracket 9 mounted to the outboard motor housing.

More specifically, the turn signal auxiliary lever apparatus 10 of the instant invention essentially comprises association with a conventional steering column 11 formed with a steering column 11a coaxially therethrough, wherein an upper housing 12 and a lower housing 13 are joined in a fixed surrounding relationship relative to the steering column housing 11 without obstruction of the use of the gear shift lever 14 associated with the typical steering column housing 11. A turn signal indicator lever 15 is directed in a leftward orientation in a conventional manner relative to the steering housing column 11 and is pivoted relative to a housing in a manner known in the prior art to indicate a right or leftward intention of an operator of the vehicle to turn the vehicle in the aforenoted direction. A first collar 16 surroundingly and slidingly receives the turn signal indicator lever 15 therethrough. The first collar 16 includes a first flange 17 oriented orthogonally and upwardly relative to the first collar 16, with a first pivot axle 18 directed orthogonally through the first flange 17. The first pivot axle 18 pivotally mounts a lower terminal end of a first leg segment 20 of an actuation lever 19. The actuation lever 19 extends from the first collar 17 overlying the upper and lower housings 12 and 13 and extending in a rightward orientation relative thereto in companion association with the gear shift lever 14 to permit right-hand manipulation of the associated turn signal indicator lever 15. The first leg segment 20, as noted above, is pivotally mounted at its lower terminal end at the first pivot axle 18, wherein an upper terminal end of the first leg segment 20 is orthogonally and integrally joined to a second leg segment 21 that extends in a rightward orientation towards the upper housing 12. A second collar 24 is fixedly and surroundingly mounted adjacent the right terminal end of the second leg segment 21, and includes a second upper flange 25 mounted to a lower flange 25a by use of a second pivot axle 26 orthogonally directed through the second upper flange 25 and the lower flange 25a. The lower flange 25a is orthogonally and integrally mounted to a generally "L" shaped housing mount 27 fixedly mounted to a left terminal side portion of the upper housing 12. The right terminal end of the second leg segment 21 is integrally and orthogonally mounted at an obtuse included angle to a third leg segment 22 that extends rightwardly and beyond the upper and lower housings 12 and 13 terminating in an enlarged securement knob 23.

FIGS. 5 through 8 illustrate a modified third leg segment 22a, including a forward third leg shaft 31 and a rear third leg shaft 32. The forward third leg shaft 31 slidably receives a sleeve 30 thereon, wherein a spring-biased detent 28 cooperates with one of an aligned series of spaced apertures 29 formed longitudinally through the surrounding wall of the sleeve 30 to permit telescoping reception of the sleeve 30 over the forward third leg shaft 31. The sleeve 30 terminates in a securement knob 23a. This permits accommodation of the effective length of the third leg segment 22 of the actuation lever 19 accommodating various physical characteristics of individuals and a surrounding automotive environment. Further, a rotatable coupling 33 adjustably and rotatably mounts the forward third leg shaft 31 to the rear third leg shaft 32. The rotatable coupling 33 includes a first cylindrical coupling member 34 integrally mounted to and diametrically aligned with the rear third leg shaft 32, with a second cylindrical coupling member 35 diametrically and integrally aligned with the forward third leg shaft 31. The respective first and second cylindrical coupling members 34 and 35 include respective first and second radially arranged arrays of teeth 36 and 37 cooperative with one another to permit angular orientation of the forward and rear third leg shafts 31 and 32 relative to one another. The first cylindrical coupling member 34 includes a first threaded central aperture 38 coaxially directed therethrough, with a second smooth central aperture 39 coaxially aligned and directed through the second cylindrical coupling member 35. A threaded shaft 40 is directed through the smooth central aperture 39 and threadedly received within the first threaded central aperture 38 to fixedly secure the first and second cylindrical coupling members 34 and 35 in a predetermined angular orientation relative to one another. The threaded shaft 40 includes an enlarged grasping head 41 defined by a diameter greater than that of the threaded shaft 40 to thereby clampingly secure the coupling members together. A plurality of housing fasteners 42 are directed through the lower housing 13 and received within the upper housing 12 to secure the housing and the associated steering column shaft together, wherein column fasteners 43 are directed through the lower housing 13 and received within the lower housing 13 to ensure that the upper and lower housings 12 and 13 are not permitted to rotate or reposition themselves relative to the steering column housing 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A turn signal auxiliary lever apparatus for mounting to a steering column housing, the steering column housing including a gear shift lever directed in a rightward orientation relative to the housing and a turn signal lever directed in a leftward orientation relative to the steering column housing, the apparatus comprising, an upper housing for overlying the steering column housing, and a lower housing for underlying the steering column housing wherein the upper and lower housings are securable together to receive the steering column housing therebetween, and a first collar for surroundingly and slidably receiving the turn signal indicator lever, with the first collar including a first flange directed orthogonally and upwardly relative to the first collar, with a first pivot axle orthogonally directed through the first flange, and an elongate actuation lever defined by a first leg segment, a second leg segment, and a third leg segment, wherein each leg segment is angularly oriented relative to one another, and the first leg segment includes a lower terminal end receiving the first pivot axle therethrough, and the third leg segment extends above and beyond the upper housing in a rightward orientation to be adjacent the gear shift lever, and wherein the first leg segment is orthogonally and integrally jointed to the second leg segment, the second leg segment including a forward terminal end jointed to the third leg segment, and a second collar fixedly and surroundingly clamping the second leg segment adjacent its forward terminal end, wherein the second collar includes an upper flange directed downwardly from the second collar and pivotally joined to a lower flange, the upper and lower flanges joined together including a second axle pivotally directed through the upper and lower flanges, and the lower flange orthogonally mounted to an "L" shaped housing mount, the "L" shaped housing mount fixedly secured to an upper surface of the upper housing, and wherein the second leg segment is joined at the third leg segment at an obtuse included angle therebetween, and wherein the third leg segment includes a forward third leg shaft pivotally joined to a rear third leg shaft, the rear third leg shaft integrally joined to the forward end of the second leg segment at a rear terminal end of the rear third leg shaft, and a forward end of the rear third leg shaft pivotally joined at a rear terminal end of the forward third leg shaft, including a rotatable coupling, and wherein the rotatable coupling includes a first cylindrical coupling member diametrically aligned with the forward end of the rear third leg shaft, and the rotatable coupling further includes a second cylindrical coupling member diametrically and integrally joined to a rear terminal end of the forward third leg shaft, and the first and second cylindrical coupling members each including confronting serrated teeth, the serrated teeth arranged in a radial array about interior confronting surfaces of the respective first and second cylindrical coupling members, and wherein the first cylindrical coupling member includes a first threaded central aperture coaxially directed therethrough aligned with a smooth central aperture formed coaxially through the second cylindrical coupling member, and a threaded shaft threadedly received within the first threaded central aperture, and the threaded shaft including an enlarged head defined by a diameter greater than a further diameter defined by the threaded shaft, wherein the large head overlies an exterior surface of the second cylindrical coupling member, and wherein the threaded shaft is received within the first threaded central aperture, and wherein the forward third leg shaft further includes a sleeve telescopingly received thereon, the sleeve includes a series of aligned apertures directed through a wall defined by the sleeve, and a spring-biased detent mounted on the forward third leg shaft selectively directed within one of the aligned series of spaced apertures to permit relative repositioning of the sleeve.

2. An apparatus as set forth in claim 1 including a plurality of column fasteners directed through the lower housing to be received within the steering column housing to fixedly position the lower housing relative to the steering column housing, and further including a plurality of housing fasteners to secure the upper housing fixedly relative to the lower housing.

* * * * *